Patented Aug. 29, 1950

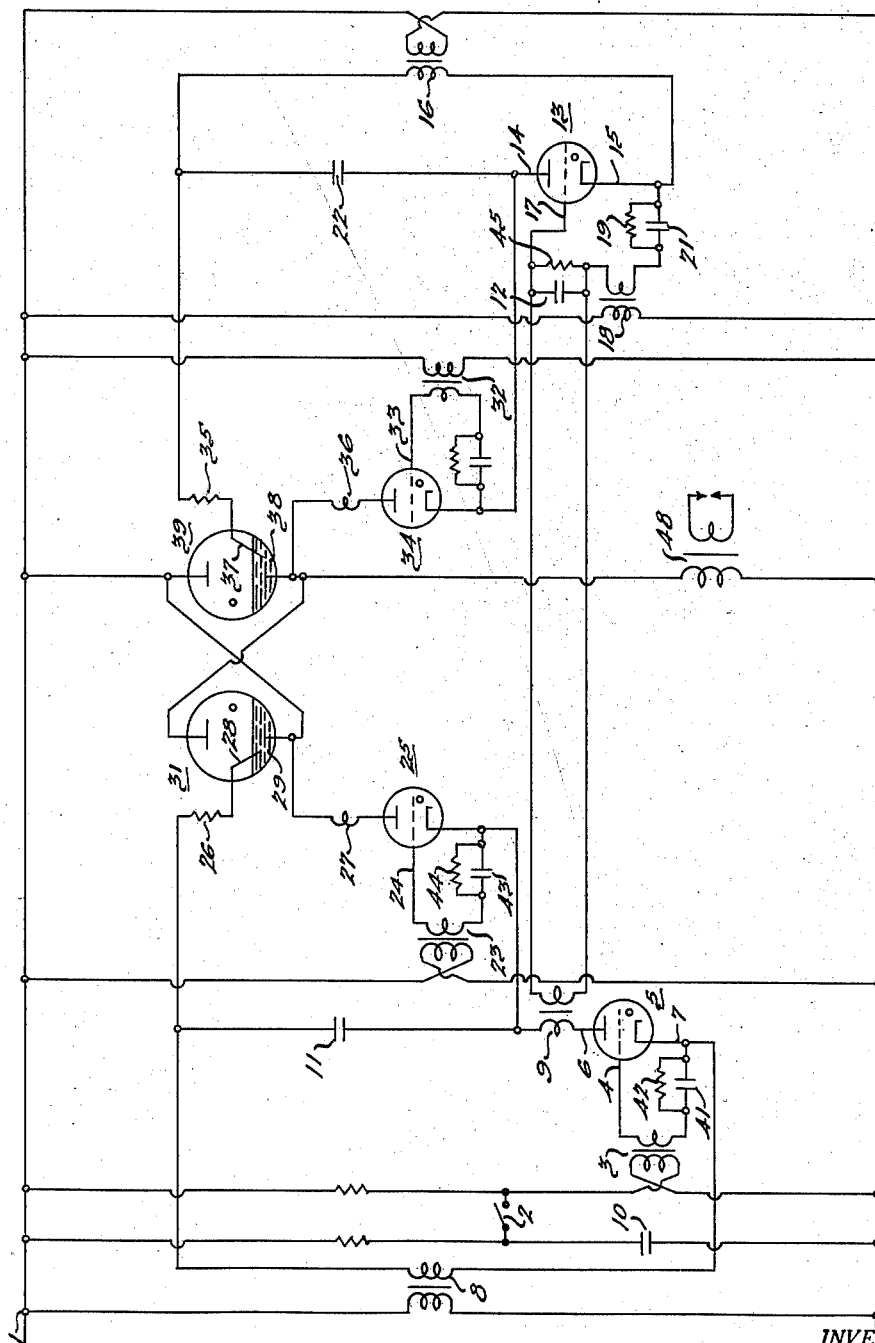
Aug. 29, 1950 — H. I. STANBACK ET AL — 2,520,477
LEAD-TRAIL CONTROL SYSTEM FOR ELECTRIC DISCHARGE TUBES
Filed March 2, 1949
INVENTORS.
Harris I. Stanback,
Ernest G. Anger.
BY
ATTORNEY.

2,520,477

UNITED STATES PATENT OFFICE 2,520,477

LEAD-TRAIL CONTROL SYSTEM FOR ELECTRIC DISCHARGE TUBES

Harris I. Stanback, Milwaukee, and Ernest G. Anger, Wauwatosa, Wis., assignors to Square D Company, Detroit, Mich., a corporation of Michigan Application March 2, 1949, Serial No. 79,212

8 Claims. (Cl. 315—246)

This invention relates to an improved system of obtaining alternate, sequenced conduction of electric discharge tubes, especially in welder controls.

It is well known that serious transient currents and subsequent injurious effects result when residual magnetism, left in the welding transformer from a previous welding operation, is present at the beginning of a subsequent weld. Such residual magnetism causes transient currents which adversely affect the welding operation where accurate welds are required, increase heating and spitting of the electrode tips, and increase the disturbance of the power supply system due to the welding operation. These transient currents are reduced by equipment adapted to cause each weld to start with a polarity opposite to that which ended the preceding weld.

One of the objects of this invention is to provide an improved system for obtaining welding action which always starts with a polarity opposite to that with which it last ended, in which the output of a series transformer in the charging circuit for a capacitor controlling the firing of one electric discharge tube controls the operation of the charging circuit for a capacitor controlling the firing of another electric discharge tube.

Another object is to provide an improved system for obtaining a welding action resulting in only even numbers of half cycles (or parts thereof) of weld current in which pairs of electric discharge tubes are used, firing capacitors being employed to start the conduction of the discharge tubes, and in which electric valves control the admission of charge to these firing capacitors, the output of a transformer in series with one of these electric valves charging a capacitor to initiate conduction of the other electric valve.

Other objects and features of the invention will be readily apparent to those skilled in the art from the specification and appended drawings illustrating certain preferred embodiments in which the figure is a simplified schematic wiring diagram of the system illustrating the present invention.

In the appended drawing, cathode heaters, grid resistors, surge by-pass capacitors, and other conventional elements have been omitted to simplify the showing and description since they do not of themselves form a part of the invention, although they customarily would be present in an operating system.

The circuit diagram illustrating the invention includes an initiating switch 2 which may be a simplified representation of a timing circuit.

Before closure of the switch 2, the secondary voltage of transformer 3 supplies an alternating hold-off voltage to the grid 4 of valve 5 which is opposite in polarity to the voltage supplied by transformer 8 to the anode 6 and which, added to the negative charge drawn into capacitor 41 by grid conduction during the times the anode is negative, causes the grid normally to be negative at all instances when the anode is positive, thus preventing conduction. Closure of the switch 2 causes the phase of this voltage to be shifted by capacitor 10, so that the grid is positive when the anode is positive, the valve 5 thereby being caused to conduct. In series with the plate and cathode of valve 5 and the secondary of the firing charge supply transformer 8 is firing capacitor 11. The firing capacitor is selected to provide the capacity necessary for the discharge impulse required for firing.

For controlling the firing current to the igniter circuit of an ignitron tube 31, there is provided an electric valve 25 having its anode and cathode in series with the igniter 28 and mercury pool 29 of ignitron tube 31 and with firing capacitor 11. The bias for the grid of valve 25 is supplied from the bias transformer 23 and bias capacitor and resistor 43 and 44. Also in series with the igniter circuit are a resistance 26 and inductance 27 serving to properly shape the discharge pulse flowing through the igniter circuit when the valve 25 conducts.

A second ignitron tube 39 is shown in Figure 1 connected in inverse parallel with ignitron tube 31, so that both half cycles of the alternating current supply will be passed through the load, indicated by the welder transformer 48. Ignitron tube 39 has a firing control circuit similar to that of ignitron tube 31. The primary of transformer 16 is energized from the supply, the secondary of transformer 16 is connected across the firing capacitor 22 through the anode 14 and cathode 15 of valve 13. Transformer 18, energized from the supply, is connected to supply hold-off bias to the grid 17 of electric valve 13 in cooperation with hold-off bias capacitor 21 bridged by resistor 19.

Also provided in the grid circuit of valve 13 is a capacitor 12 bridged by resistor 45 and connected across the secondary of transformer 9, the primary of which is connected in series with electric valve 5 and the firing capacitor 11. To control the firing current to the igniter, electric valve 34 is connected across the firing capacitor 22 through the igniter 37 and mercury pool 38 of electric discharge tube 39. Resistor 35 and inductor 36 serve to properly shape the firing pulse. A transformer 32 energized from the supply is provided to supply hold-off bias to the grid 33 of valve 34 in conventional manner.

The firing control circuits for electric discharge tubes 31 and 39 may be accompanied by other control elements which could time the weld, control the sequencing of a welding operation, or accomplish other desired welding performance.

The operation to fire an ignitron and initiate conduction thereof will be briefly described. Operation of the initiating means, simplified in the diagram to the closing of switch 2, causes a shift in phase of the voltage across the transformer 3, as previously described, this phase shift causing the transformer secondary to provide a positive voltage in the circuit of the grid of valve 5 at the time the anode 6 of valve 5 is positive so that the valve conducts. The conduction of valve 5 charges firing capacitor 11 from the secondary of transformer 8, through the primary of transformer 9. With capacitor 11 charged, the valve 5 is cut off and becomes non-conducting. When thereafter the bias on the grid of valve 25 becomes sufficiently less negative, the valve 25 conducts to discharge the capacitor 11 through the igniter of ignitron 31. This occurs when the anode of ignitron 31 is positive, and the ignitron conducts supply current to the load.

Each time electric valve 5 conducts to charge the firing capacitor 11, transformer 9 is energized. The secondary of transformer 9 delivers a charge to capacitor 12 in the grid circuit of electric valve 13. The secondary of transformer 16 is so polarized as to supply positive voltage to the anode 14 of electric valve 13 during the half cycle following that during which the capacitor 12 was charged. During this positive half cycle, the charge on capacitor 12 is discharged into the grid circuit of valve 13, providing a sufficiently positive voltage to the grid 17 to cause the valve 13 to conduct. The conduction of valve 13 serves to admit a charge supplied by the secondary of transformer 16 to the firing capacitor 22. Valve 13 then ceases to conduct. During the half cycle immediately following that during which valve 13 conducts, the grid 33 of electric valve 34 becomes sufficiently positive to cause valve 34 to conduct, discharging firing capacitor 22 through the igniter 37 and mercury pool cathode 38 of electric discharge tube 39. This occurs during a half cycle in which the anode of electric discharge tube 39 is positive; the discharge tube 39 therefore is caused to conduct current during a half cycle to the load, illustrated by welding transformer 48.

It will readily be seen, therefore, that both half cycles of alternating current are passed to the load, and inasmuch as the conduction of electric discharge tube 39 depends upon the operation of the firing circuit of discharge tube 31, the discharge tube 39 can, and always does, conduct only after discharge tube 31 has conducted. Each welding operation, therefore, always starts with current flowing in one direction through the transformer and ends with current flowing in the opposite direction. Further the initial direction of current flow through the welding transformer is always the same, since tube 31 will always conduct first and when its anode is positive. The resulting transient currents will, therefore, be minimized. It will also be seen that the timing of weld current flow will always be in whole cycles since tube 39 will always conduct after tube 31 conducts.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a system for controlling the conduction of a pair of electric discharge tubes connected in inverse parallel to a load circuit, a pair of electric discharge tubes of the type having a pair of principal electrodes and a third control electrode for initiating the passage of current between the principal electrodes for controlling the passage of current to a load, means including an electric valve controlling the conduction of one of said electric discharge tubes by energizing the control electrode thereof, means controlling the conduction of said electric valve, means including a second electric valve controlling the conduction of the other of said electric discharge tubes by energizing the control electrode thereof, a transformer, a capacitor, means connecting the primary of said transformer in series with said first electric valve, means connecting the secondary of said transformer across said capacitor, and means connecting said capacitor in the grid circuit of said second electric valve so that said second electric valve conducts during each half cycle following that during which said first electric valve conducts.

2. In a system for controlling the conduction of a pair of electric discharge tubes connected in inverse parallel to a load circuit, a pair of electric discharge tubes of the type having a pair of principal electrodes and a third control electrode for initiating the passage of current between the principal electrodes for controlling the passage of current to a load, means including an electric valve controlling the conduction of one of said electric discharge tubes by energizing the control electrode thereof, means controlling the conduction of said electric valve, means including a second electric valve controlling the conduction of the other of said electric discharge tubes by energizing the control electrode thereof, a transformer, a capacitor, means connecting the primary of said transformer in series with said first electric valve, means connecting the secondary of said transformer across said capacitor, means connecting said capacitor in the grid circuit of said second electric valve so that said second electric valve conducts during each half cycle following that during which said first electric valve conducts, and means for dissipating the charge on said capacitor so as to prevent the conduction of said second electric valve during any half cycles except those immediately following the ones during which said first electric valve conducts.

3. In a system for controlling the conduction of a pair of electric discharge tubes connected in inverse parallel to a load circuit, a pair of electric discharge tubes of the type having a pair of principal electrodes and a third control electrode for initiating the passage of current between the principal electrodes for controlling the passage of current to a load, means including an electric valve controlling the conduction of one of said electric discharge tubes by energizing the control electrode thereof, means controlling the conduction of said electric valve, means including a second electric valve controlling the conduction of the other of said electric discharge tubes by energizing the control electrode thereof, a transformer, a capacitor, means connecting the primary of said transformer in series with said first electric valve, means connecting the secondary of said transformer across said capacitor, means connecting said capacitor in the grid circuit of said second electric valve so that said second electric valve conducts during each half cycle following that during which said first electric valve conducts, means for dissipating the charge on said capacitor so as to prevent the conduction of said second electric valve during any half cycles except those immediately following the ones during which said first electric valve conducts, together with means for igniting one of said pair of electric discharge tubes in the half cycle following the conduction of said first electric valve and means for igniting the other of said pair of electric discharge tubes in the half cycle following the conduction of said second electric valve.

4. In a system for controlling the conduction of a pair of electric discharge tubes connected in inverse parallel to a load circuit, a pair of electric discharge tubes of the type having a pair of principal electrodes and a third control electrode for initiating the passage of current between the principal electrodes for controlling the passage of current to a load, means including an electric valve controlling the conduction of one of said electric discharge tubes by energizing the control electrode thereof, means controlling the conduction of said electric valve, means including a second electric valve controlling the conduction of the other of said electric discharge tubes by energizing the control electrode thereof, a transformer, a capacitor, means connecting the primary of said transformer in series with said first electric valve, means connecting the secondary of said transformer across said capacitor, means connecting said capacitor in the grid circuit of said second electric valve so that said second electric valve conducts during each half cycle following that during which said first electric valve conducts, means for dissipating the charge on said capacitor so as to prevent the conduction of said second electric valve during any half cycles except those immediately following the ones during which said first electric valve conducts, and means including other capacitors to aid the initiation of conduction of said electric discharge tubes, and means for charging said other capacitors when said electric valves conduct.

5. In a system for controlling the conduction of a pair of electric discharge tubes connected in inverse parallel to a load circuit, a pair of electric discharge tubes of the type having a pair of principal electrodes and a third control electrode for initiating the passage of current between the principal electrodes for controlling the passage of current to a load, means including an electric valve controlling the conduction of one of said electric discharge tubes by energizing the control electrode thereof, means controlling the conduction of said electric valve, means including a second electric valve controlling the conduction of the other of said electric discharge tubes by energizing the control electrode thereof, a transformer, a capacitor, means connecting the primary of said transformer in series with said first electric valve, means connecting the secondary of said transformer across said capacitor, and means connecting said capacitor in the grid circuit of said second electric valve so that said second electric valve conducts during each half cycle following that during which said first electric valve conducts, means for dissipating the charge on said capacitor so as to prevent the conduction of said second electric valve during any half cycles except those immediately following the ones during which said first electric valve conducts, and means including capacitors to aid the initiation of conduction of said electric discharge tubes, means for charging said other capacitors when said electric valves conduct, and means for discharging said last mentioned capacitors through the control electrodes of said electric discharge tubes.

6. In a system for controlling the conduction of a pair of electric discharge tubes connected in inverse parallel to a load circuit, a pair of electric discharge tubes of the type having a pair of principal electrodes and a third control electrode for initiating the passage of current between the principal electrodes for controlling the passage of current to a load, means including an electric valve controlling the conduction of one of said electric discharge tubes by energizing the control electrode thereof, means controlling the conduction of said electric valve, means including a second electric valve controlling the conduction of the other of said electric discharge tubes by energizing the control electrode thereof, a transformer, a capacitor, means connecting the primary of said transformer in series with said first electric valve, means connecting the secondary of said transformer across said capacitor, means connecting said capacitor in the grid circuit of said second electric valve so that said second electric valve conducts during each half cycle following that during which said first electric valve conducts, means for dissipating the charge on said capacitor so as to prevent the conduction of said second electric valve during any half cycles except those immediately following the ones during which said first electric valve conducts, said transformer and capacitor being the only control for effecting conduction of said second valve, whereby in each new load energization, the first electric discharge tube will conduct first and will always be followed by conduction of the other discharge tube so that load current will always flow during an even number of half cycles.

7. In a system for controlling the conduction of a pair of electric discharge tubes connected in inverse parallel to a load circuit, a pair of electric discharge tubes for controlling the passage of current to a load, a capacitor, means connecting said capacitor in the igniter circuit of one of said electric discharge tubes, means including an electric valve controlling the charge on said capacitor, a transformer, means connecting the primary of said transformer in series with said electric valve, means controlling the discharge of said capacitor to effect conduction of said electric discharge tube, a second capacitor, means connecting said second capacitor in the igniter circuit of the other of said pair of electric discharge tubes, means including a second electric valve controlling the charge on said second capacitor, means controlling the discharge of said second capacitor to effect conduction of said second electric discharge tube, and capacitive means responsive to flow of current through said transformer for imposing a voltage in the circuit of the control grid of said second electric valve such that said second valve will conduct during the next half cycle after the energization of said transformer by conduction of the first electric valve.

8. In a system for controlling the conduction of a pair of electric discharge tubes connected in inverse parallel to a load circuit, a pair of electric discharge tubes for controlling the passage of current to a load, a capacitor, means connecting said capacitor in the igniter circuit of one of said electric discharge tubes, means including an electric valve controlling the charge on said capacitor, a transformer, means connecting the primary of said transformer in series with said electric valve, means controlling the discharge of said capacitor to effect conduction of said electric discharge tube, a second capacitor in the igniter circuit of the other of said pair of electric discharge tubes, means including a second electric valve controlling the charge on said second capacitor, means controlling the discharge of said second capacitor to effect conduction of said second electric discharge tube, and means inluding a capacitor for imposing a voltage from the secondary of said series transformer in the circuit of the control grid of said second electric valve such that said second valve will conduct during the next half cycle after the energization of said transformer by conduction of the first electric valve.

HARRIS I. STANBACK.
ERNEST G. ANGER.

REFERENCES CITED

The following references are of record in the file of this patent:

UNITED STATES PATENTS

| Number | Name | Date |
| --- | --- | --- |
| 2,167,498 | Chambers | July 25, 1939 |
| 2,174,386 | King | Sept. 26, 1939 |
| 2,306,230 | Somerville | Dec. 22, 1942 |